United States Patent
Yamazaki

(10) Patent No.: US 7,116,494 B2
(45) Date of Patent: Oct. 3, 2006

(54) OPTICAL APPARATUS AND METHOD FOR ADJUSTING AMOUNT OF LIGHT OF THE SAME

(75) Inventor: Masahiro Yamazaki, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/996,733

(22) Filed: Nov. 24, 2004

(65) Prior Publication Data

US 2005/0146799 A1 Jul. 7, 2005

(30) Foreign Application Priority Data

Nov. 27, 2003 (JP) ............................ P2003-397392

(51) Int. Cl.
G02B 13/18 (2006.01)
G02B 3/02 (2006.01)
G02B 7/02 (2006.01)

(52) U.S. Cl. ....................................... 359/719; 359/811

(58) Field of Classification Search ................. 359/719, 359/811, 813; 369/112.23, 112.24, 44.23
See application file for complete search history.

(56) References Cited

U.S. PATENT DOCUMENTS 5,742,577 A * 4/1998 Horimai et al. ........ 369/112.19
5,808,986 A * 9/1998 Jewell et al. ................ 369/121
6,724,544 B1 * 4/2004 Kishima et al. ............. 359/719
2003/0053394 A1 * 3/2003 Park et al. .............. 369/112.24

FOREIGN PATENT DOCUMENTS

| JP | 05-250716 A | 9/1993 |
| JP | 5-264338 A | 10/1993 |
| JP | 6-012696 A | 1/1994 |
| JP | 11-232653 A | 8/1999 |
| JP | 2002-312973 A | 10/2002 |

* cited by examiner

Primary Examiner—Alicia M. Harrington
(74) Attorney, Agent, or Firm—Morrison & Foerster LLP

(57) ABSTRACT

An optical apparatus provided in an optical pickup includes first and second light sources, a light splitting element, a condensing lens, a mounting base, a light receiving element, and a protruding piece formed on the condensing lens. The condensing lens guides transmission light from the first light source or reflection light from the second light source that are split by the light splitting element to the light receiving element. By grasping the protruding piece to protrude in a direction perpendicular to a lens axis of the condensing lens, and adjusting a mounting position of the condensing lens on the mounting base, a sufficient amount of light for stable control of a light output is applied to the light receiving element for light output monitor.

19 Claims, 11 Drawing Sheets

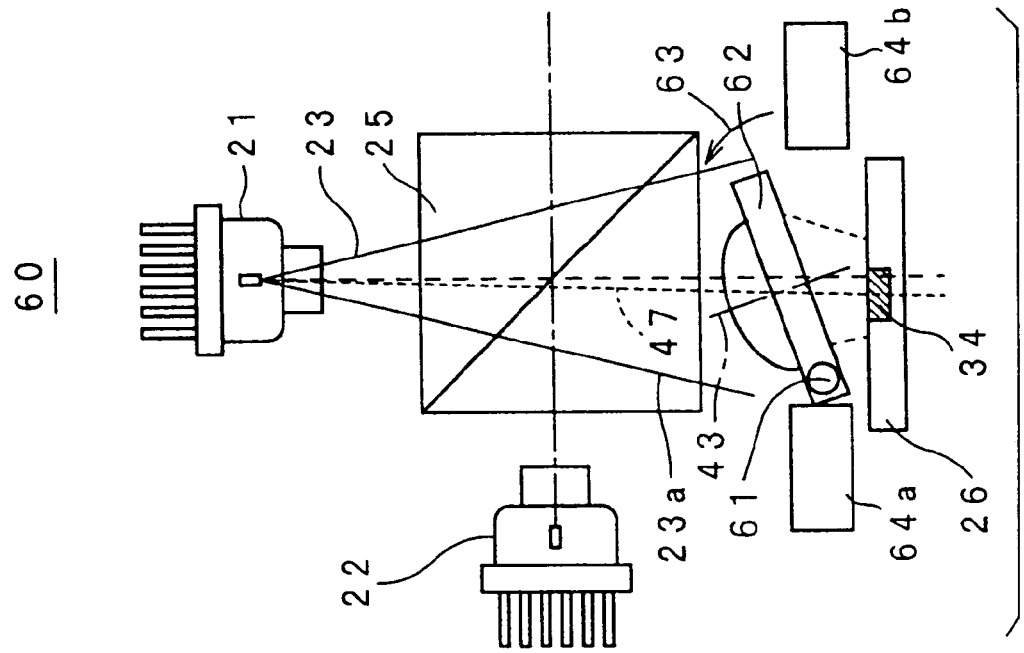
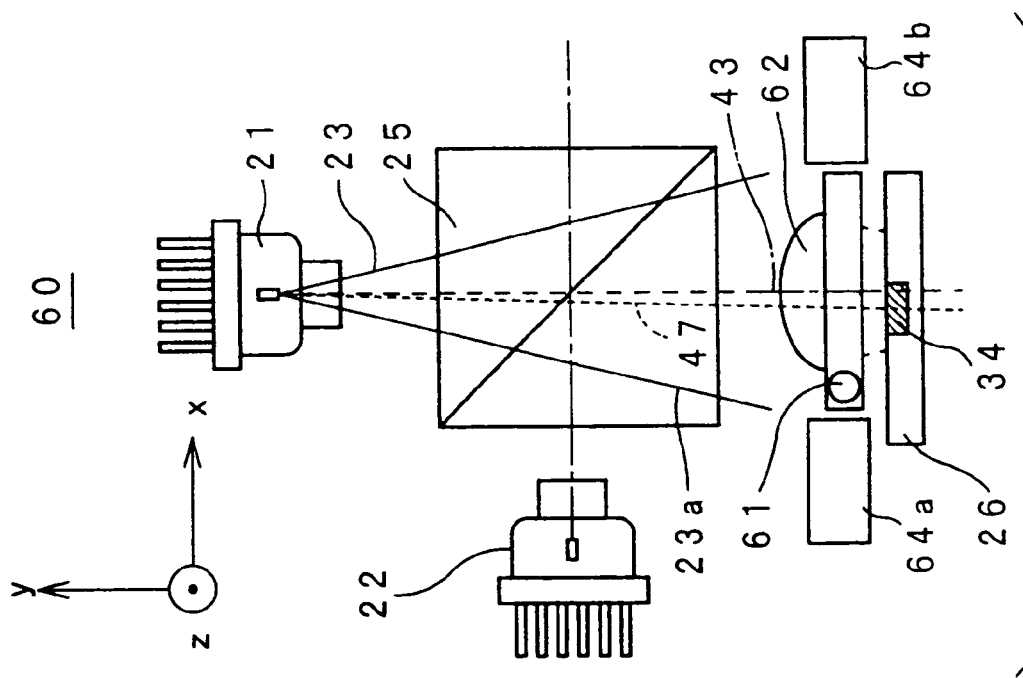

OPTICAL APPARATUS AND METHOD FOR ADJUSTING AMOUNT OF LIGHT OF THE SAME

CROSS-REFERENCE TO RELATED APPLICATION

This application claims priority to Japanese Patent Application No. JP2003-397392, filed on Nov. 27, 2003, the contents of which are incorporated herein by reference in their entirety.

BACKGROUND OF THE INVENTION

1. Field of the Invention

The present invention relates to an optical apparatus composed of a light source and an optical component, for example, an optical apparatus such as a light output monitor of a light source provided in an optical pickup installed in an optical recording and reproducing apparatus, and a method for adjusting the amount of light of the same.

2. Description of the Related Art

Some information recording and reproducing apparatuses using an optical recording method record on and reproduce from plural kinds of optical recording mediums based on various standards, such as a compact disk (abbreviated as CD) and a digital versatile disk (abbreviated as DVD). FIG. 10 is a view showing a structure of a major part of a conventional optical pickup apparatus 1. FIG. 10 shows the optical pickup apparatus 1 structured so as to have two light sources, that is, first and second light sources 2, 3 in order to record on and reproduce from two kinds of recording mediums (hereafter, sometimes referred to as optical disks) having different standards by using a single optical pickup.

In the optical pickup apparatus 1, a first light beam 4 emitted from the first light source 2 is mostly reflected by a beam splitter 5 and enters a collimator lens 6, is made to become a parallel ray by the collimator lens 6 and enters an objective lens 7, and is converged by the objective lens 7 and applied to an optical disk 8 as a light spot having a minute diameter. Moreover, a second light beam 9 emitted from the second light source 3 is mostly transmitted by the beam splitter 5 and enters the collimator lens 6, is made to become a parallel ray by the collimator lens 6 and enters the objective lens 7, and is converged by the objective lens 7 and applied to the optical disk 8 as a light spot having a minute diameter.

The optical pickup 1 is generally provided with a monitor light receiving element 10 so as to monitor the amount of light of the first light beam 4 emitted from the first light source 2 or the second light beam 9 emitted from the second light source 3, and APC (automatic power control) is executed so that the amount of emission light of the first light beam 4 emitted from the first light source 2 or the second light beam 9 emitted from the second light source 3 is controlled to a proper value on the basis of a signal detected by the monitor light receiving element 10.

FIG. 11 is a view showing a state where a light output of the first light source 2 is monitored, and FIG. 12 is a view showing a state where a light output of the second light source 3 is monitored. In light output monitor regarding the first light source 2, part of the first light beam 4 emitted from the first light source 2 is transmitted by the beam splitter 5 to become a first transmission light beam 11, and the first transmission light beam 11 is made enter the light receiving element 10. Moreover, in light output monitor regarding the second light source 3, part of the second light beam 9 emitted from the second light source 3 is reflected by the beam splitter 5 to become a second reflection light beam 12, and the second reflection light beam 12 is made enter the light receiving element 10.

However, in the related art, the amount of light made enter the collimator lens 6, that is, light used for recording and reproducing information is preferentially made larger, so that only approximately 1% to 5% at most of light emitted from the light source is guided to the monitor light receiving element 10.

Particularly, in recent years, increase of the amount of light reaching the surface of an optical disk as much as possible is required as an optical disk apparatus becomes capable of high-speed recording and reproducing, so that the actual situation is that it is impossible to decrease the amount of light used for recording and reproducing information in order to increase the amount of light for monitor. There is such a relation between the amount of light for monitor and the amount of light used for recording and reproducing information that one has to be decreased when the other is increased, and it is difficult to increase both of them at the same time.

Further, light applied to the light receiving element 10 is divergent light, and the area of the light applied to the light receiving element 10 is far larger than a light receiving portion 13 serving as a light detecting portion disposed to the light receiving element 10. In contrast, the light receiving portion 13 has been further miniaturized so as to increase the sensitivity thereof in recent years. Therefore, there is a problem such that the amount of light detected by the light receiving portion 13 is small, that is, the level of a detection signal is small.

Still further, the size of the light receiving portion 13 is approximately 0.7 mm in diameter in the present circumstances, whereas there are variations as large as approximately ±0.3 mm in the accuracy of installation of the light receiving portion 13 to the external dimension of the light receiving element 10. Therefore that there is a problem such that the level of a signal detected by the light receiving element 10 largely varies according to each optical pickup apparatus. Furthermore, in a case where an installation position of the light receiving portion 13 in the light receiving element 10 is not in and around the center of the light receiving element 10 but leans to a peripheral portion thereof, the light receiving portion 13 is disposed so as to lean to a side of the top surface or the bottom surface of the light pickup apparatus. When the position of the light receiving portion 13 leans in this manner, a periphery portion of the light spot with a weak strength is detected, so that the level of a detection signal becomes small, and there is a problem such that stable control of a light output is difficult.

In one of related arts to solve these problems, a best-suited condensing lens to an optical system of an optical apparatus in order to condense light to a light receiving portion is used and fixed in a predetermined position. Moreover, in another related art, a light receiving element unit such that a light receiving element is embedded in a block with a light entering surface formed on a focusing surface so as to face the entering surface is used (refer to Japanese Unexamined Patent Publication JP-A 5-264338 (1993)).

However, these related arts have problems as described below. It is necessary to produce a condensing lens or a light receiving element unit with a lens surface dedicated for each optical apparatus. Moreover, since it is difficult to respond to variations of individual light receiving elements, there arises loss in the amount of light. Further, it is necessary in correction of the optical apparatus or the light receiving element, to process so as to newly form an attachment portion to a fixture surface, or to remake the light receiving element unit, which is a great disadvantage in the respect of the cost of manufacturing.

SUMMARY OF THE INVENTION

An object of the invention is to provide an optical apparatus that is capable of applying light to a monitor light receiving element in a sufficient amount for stable control of a light output of a light source without decreasing the amount of light for a major use in a simple structure, and a method for adjusting the amount of light of the same.

The invention provides an optical apparatus comprising:
   a light source for emitting light;
   a light splitting element for splitting light by transmitting or reflecting part of light emitted from the light source;
   a light receiving element for receiving the transmission light or reflection light split by the light splitting element; and
   a condensing lens, disposed between the light splitting element and the light receiving element, for guiding the transmission light or reflection light split by the light splitting element to the light receiving element; and
   a mounting base for mounting the condensing lens.

In addition, in the invention, the optical apparatus further comprises adjusting means for adjusting a mounting position of the condensing lens on the mounting base.

Further, in the invention, the adjusting means includes a protruding piece formed so as to protrude from the condensing lens in a direction perpendicular to a central axis of the condensing lens and extend like a rod.

Still further, in the invention, one protruding piece is formed on a side facing the mounting base of the condensing lens.

Still further, in the invention, two long grooves are formed on the mounting base so as to face the condensing lens and cross at right angles.

Still further, in the invention, a through hole that faces the condensing lens and pierces the mounting base in a direction perpendicular to a central axis of the condensing lens, is formed in the mounting base.

Still further, in the invention, the condensing lens and the mounting base are placed so that the protruding piece formed on the condensing lens passes through the through hole of the mounting base, and
   an extension length of the protruding piece is more than thickness of the mounting base in a direction where the through hole pierces.

Still further, in the invention, an ultraviolet cure adhesive is filled in the through hole of the mounting base in a state where a relative position of the condensing lens on the mounting base is adjusted.

Still further, in the invention, a protruding portion of the protruding piece that protrudes from the through hole on a side opposite to a side facing the condensing lens, is cut and removed in a state where a relative position of the condensing lens on the mounting base is adjusted.

Still further, in the invention, the protruding piece is formed in a position away from the central axis of the condensing lens in a direction perpendicular to the central axis, and
   the condensing lens is capable of angular displacement about an axial line of the protruding piece.

Still further, in the invention, the protruding piece has a cross section decreasing portion where a cross section in a direction perpendicular to a direction where the protruding piece extends like a rod decreases.

Still further, in the invention, the condensing lens is made of resin, and
   the protruding piece protruding from the condensing lens and formed like a rod, is a resin mold product molded at a gate portion at a time of molding the condensing lens.

Still further, in the invention, the condensing lens is formed like an arch on a plan view taken from a direction parallel to a central axis thereof.

Still further, in the invention, the condensing lens is mounted so that a surface appearing as a chord on the plan view taken from a direction parallel to the central axis comes in contact with the mounting base.

Still further, in the invention, the condensing lens is formed so that a surface close to the light splitting element is a curved surface and a surface close to the light receiving element is a flat surface.

Still further, in the invention, the condensing lens and the light receiving element are placed so that an isolation distance between the condensing lens and the light receiving element becomes smaller than a focal distance of the condensing lens and so that, when a dimension of a light receiving portion on a light application surface of the light receiving element is D and variation tolerance of the light receiving portion to an external shape of the light receiving element is ±Δd, a spot diameter of light guided by the condensing lens and applied to a surface of the light receiving element becomes (D+2Δd) or more.

Still further, the invention provides an optical pickup provided with one of the optical apparatuses.

Still further, the invention provides an electronic apparatus in which the optical pickup is installed.

Still further, the invention provides a light amount adjusting method of an optical apparatus including a light source for emitting light; a light splitting element for splitting light by transmitting or reflecting part of light emitted from the light source; a light receiving element for receiving the transmission light or reflection light split by the light splitting element; a condensing lens, disposed between the light splitting element and the light receiving element, for guiding the transmission light or reflection light split by the light splitting element to the light receiving element; a protruding piece formed so as to protrude from the condensing lens in a direction perpendicular to a central axis of the condensing lens and extend like a rod; and a mounting base for mounting the condensing lens, the method comprising:
   grasping the protruding piece formed on the condensing lens; and
   moving the condensing lens in a direction parallel to an axis of light entering the condensing lens, to adjust an amount of light entering the light receiving element.

Still further, the invention provides a light amount adjusting method of an optical apparatus including a light source for emitting light; a light splitting element for splitting light by transmitting or reflecting part of light emitted from the light source; a light receiving element for receiving the transmission light or reflection light split by the light splitting element; a condensing lens, disposed between the light splitting element and the light receiving element, for guiding the transmission light or reflection light split by the light splitting element to the light receiving element; a protruding piece formed so as to protrude from the condensing lens in a direction perpendicular to a central axis of the condensing lens and extend like a rod; and a mounting base for mounting the condensing lens, the method comprising:

grasping the protruding piece formed on the condensing lens; and moving the condensing lens in a direction parallel to a surface of the mounting base where the condensing lens is mounted and in a direction perpendicular to an axis of light entering the condensing lens, to adjust an amount of light entering the light receiving element.

Still further, the invention provides a light amount adjusting method of an optical apparatus including a light source for emitting light; a light splitting element for splitting light by transmitting or reflecting part of light emitted from the light source; a light receiving element for receiving the transmission light or reflection light split by the light splitting element; a condensing lens, disposed between the light splitting element and the light receiving element, for guiding the transmission light or reflection light split by the light splitting element to the light receiving element; a protruding piece formed so as to protrude from the condensing lens in a direction perpendicular to a central axis of the condensing lens and extend like a rod; and a mounting base for mounting the condensing lens, the method comprising:

grasping the protruding piece formed on the condensing lens; and moving the condensing lens in a direction perpendicular to a surface of the mounting base where the condensing lens is mounted, to adjust an amount of light entering the light receiving element.

Still further, the invention provides a light amount adjusting method of an optical apparatus including a light source for emitting light; a light splitting element for splitting light by transmitting or reflecting part of light emitted from the light source; a light receiving element for receiving the transmission light or reflection light split by the light splitting element; a condensing lens, disposed between the light splitting element and the light receiving element, for guiding the transmission light or reflection light split by the light splitting element to the light receiving element; a protruding piece formed so as to protrude from the condensing lens in a direction perpendicular to a central axis of the condensing lens and extend like a rod; and a mounting base for mounting the condensing lens, the protruding piece being formed in a position away from the central axis of the condensing lens in a direction perpendicular to the central axis thereof, and the condensing lens being disposed so as to be capable of angular displacement about an axial line of the protruding piece, the method comprising:

grasping the protruding piece formed on the condensing lens; and causing the condensing lens to perform angular displacement about the axial line of the protruding piece, to adjust an amount of light entering the light receiving element.

According to the invention, the optical apparatus is provided with the light receiving element that is used for light output monitor of the light source, and provided with the condensing lens for guiding light transmitted or reflected by the light splitting element. Further, the optical apparatus is provided with the adjusting means for adjusting a mounting position of the condensing lens on the mounting base. Consequently, it is possible to adjust an installation position of the condensing lens to light transmitted or reflected by the light splitting element, so that an optical apparatus that is capable of applying light to the monitor light receiving element in a sufficient amount for stable control of a light output of the light source without decreasing the amount of light used for a major use, for example, used for recording and reproducing information is realized.

Further, according to the invention, the adjusting means includes the protruding piece formed so as to protrude from the condensing lens in a direction perpendicular to the central axis of the condensing lens and extend like a rod. Therefore, it is possible to grasp the protruding piece and move the condensing lens at the time of adjusting a mounting position of the condensing lens, so that it is possible to prevent damage of the condensing lens.

Still further, according to the invention, one protruding piece is formed on a side facing the mounting base of the condensing lens. Consequently, the protruding piece is formed so as to protrude in only one direction that is orthogonal to the central axis of the condensing lens, and does not occupy an unnecessary space, so that it is possible to contribute to miniaturization of the optical apparatus. Further, the protruding piece is formed limitedly on a side facing the mounting base opposite to a side where an optical recording medium is placed, so that it is possible to prevent the protruding piece from damaging the optical recording medium.

Still further, according to the invention, the two long grooves are formed on the mounting base so as to face the condensing lens and cross at right angles, so that it is possible to fix the condensing lens in an arbitrary position in a direction where the two long grooves cross at right angles, by engaging the protruding piece of the condensing lens with the long grooves and moving the condensing lens so that the protruding piece is guided by the long grooves.

Still further, according to the invention, the through hole that faces the condensing lens and pierces the mounting base in a direction perpendicular to the central axis of the condensing lens is formed in the mounting base, the condensing lens and the mounting base are placed so that the protruding piece formed on the condensing lens passes through the through hole of the mounting base, and the protruding piece is formed so that an extension length thereof becomes more than the thickness of the mounting base in a direction where the through hole pierces. Consequently, it is possible to freely move the protruding piece and the condensing lens connected to the protruding piece within the through hole in three-dimensional directions, so that it becomes possible to easily fix the condensing lens in a position where the amount of light entering the light receiving element becomes the maximum. Moreover, by forming the protruding piece so that the extension length becomes sufficiently more than the thickness of the mounting base where the through hole pierces, it becomes possible to grasp the protruding piece and easily move the condensing lens to fix a position thereof.

Still further, according to the invention, an ultraviolet cure adhesive is filled in the through hole of the mounting base in a state where a relative position of the condensing lens to the mounting base is adjusted, so that it is possible to securely mount and fix the condensing lens.

Still further, according to the invention, a protruding portion of the protruding piece that protrudes from the through hole to a side opposite to a side facing the condensing lens is cut and removed in a state where a relative position of the condensing lens to the mounting base is adjusted, so that it is possible to miniaturize the optical apparatus.

Still further, according to the invention, the protruding piece is formed in a position away from the central axis of the condensing lens in a direction perpendicular to the central axis, and the condensing lens is structured so as to be capable of angular displacement about the axial line of the protruding piece. Therefore, it becomes possible to adjust the amount of light entering the light receiving portion, by causing the condensing lens to perform angular displacement about the axial line of the protruding piece, even when there is no space that allows movement of the condensing lens within a virtual plane perpendicular to a light axis of light transmitted or reflected by the light splitting element.

Still further, according to the invention, the protruding piece has the cross section decreasing portion where the cross section in a direction perpendicular to a direction where the protruding piece extends like a rod decreases, so that it is possible to easily cut the protruding piece at the cross section decreasing portion after fixing a position of the condensing lens and mounting on the mounting base. Therefore, by forming the cross section decreasing portion in accordance with the dimension of the mounting base in advance, it is possible to prevent that the protruding piece protrudes from the mounting base after cut, so that it is possible to miniaturize the optical apparatus.

Still further, according to the invention, the protruding piece protruding from the condensing lens and formed like a rod is a resin mold product formed at a gate portion at the time of molding the condensing lens made of resin, so that it is unnecessary to prepare a special process and material for forming the protruding piece, and it is possible to realize reduction of the cost of manufacturing.

Still further, according to the invention, the condensing lens is formed like an arch, so that it is possible to incorporate the condensing lens in a limited installation space, and it is possible to contribute to miniaturization of the optical apparatus.

Still further, according to the invention, the condensing lens is mounted so that a surface forming a chord of the arch comes in contact with the mounting base. In this structure, even when the condensing lens is installed in a narrow space in response to thinning of the optical apparatus, it is possible to fix a position of the condensing lens so that the central axis of the condensing lens coincides with a virtual light axis coupling the light source and the light receiving portion. Therefore, it is possible to cause the light receiving portion to receive light in a sufficient amount for stable control of a light output of the light source.

Still further, according to the invention, the condensing lens is formed so that a surface close to the light splitting element is a curved surface and a surface close to the light receiving element is a flat surface, so that it is possible to shorten an isolation distance between the condensing lens and the light receiving element at the time of placing them, and it is possible to cause light of every radiation angle to enter the light receiving portion.

Still further, according to the invention, the condensing lens and the light receiving element are placed so that an isolation distance therebetween becomes smaller than a focal distance of the condensing lens and so that, when the dimension of the light receiving portion on the light application surface of the light receiving element is D and variation tolerance of the light receiving portion to an external shape of the light receiving element is ±Δd, a spot diameter of light guided by the condensing lens and applied to the surface of the light receiving element becomes (D+2Δd) or more, with the result that it is possible to absorb variations of an installation position of the light receiving portion on the light application surface of the light receiving element, by the dimension of the light spot diameter.

Still further, according to the invention, an optical pickup that is excellent in light output stability of a light source and an electronic apparatus provided with the same are realized.

Still further, according to the invention, by grasping the protruding piece formed on the condensing lens, and moving the condensing lens in a direction parallel to an axis of light entering the condensing lens, or moving the condensing lens in a direction parallel to a surface of the mounting base where the condensing lens is mounted and in a direction perpendicular to an axis of light entering the condensing lens, or moving the condensing lens in a direction perpendicular to a surface of the mounting base where the condensing lens is mounted, or causing the condensing lens to perform angular displacement about an axial line of the protruding piece, it is possible to adjust the amount of light entering the light receiving element. According to the light amount adjusting methods, it is possible to apply light to the light receiving portion in a sufficient amount for stable control of a light output of a light source, without damaging the condensing lens, regardless of variations of an installation position of the light receiving portion provided in the light receiving element.

BRIEF DESCRIPTION OF THE DRAWINGS

Other and further objects, features, and advantages of the invention will be more explicit from the following detailed description taken with reference to the drawings wherein:

FIGS. 6A and 6B are views showing a structure and a light amount adjusting method of an optical apparatus provided in an optical pickup according to a third embodiment of the invention;

DETAILED DESCRIPTION

Figure 1:
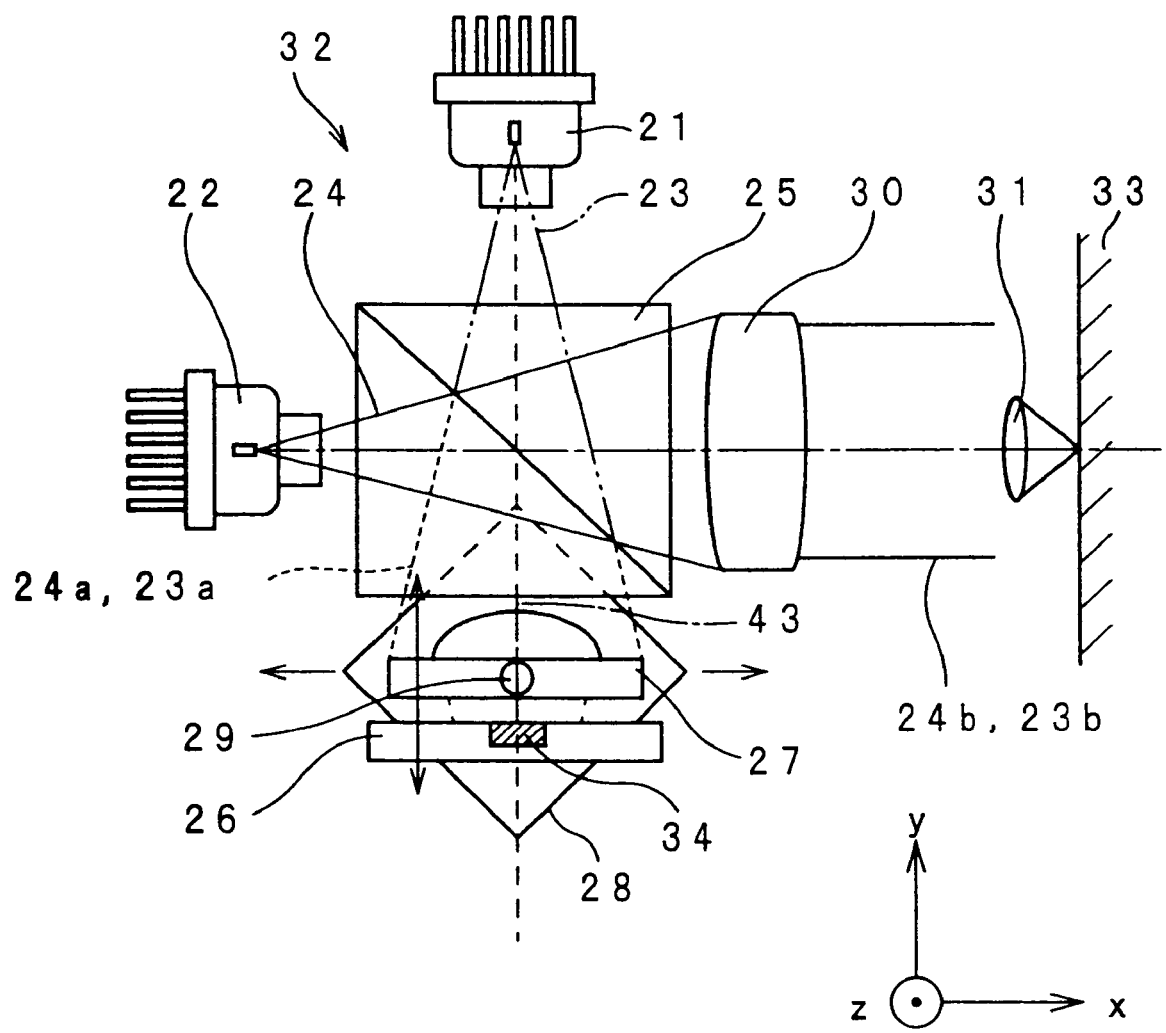
FIG. 1 is a simplified view showing a structure of an optical pickup according to a first embodiment of the invention.
Figure 2:
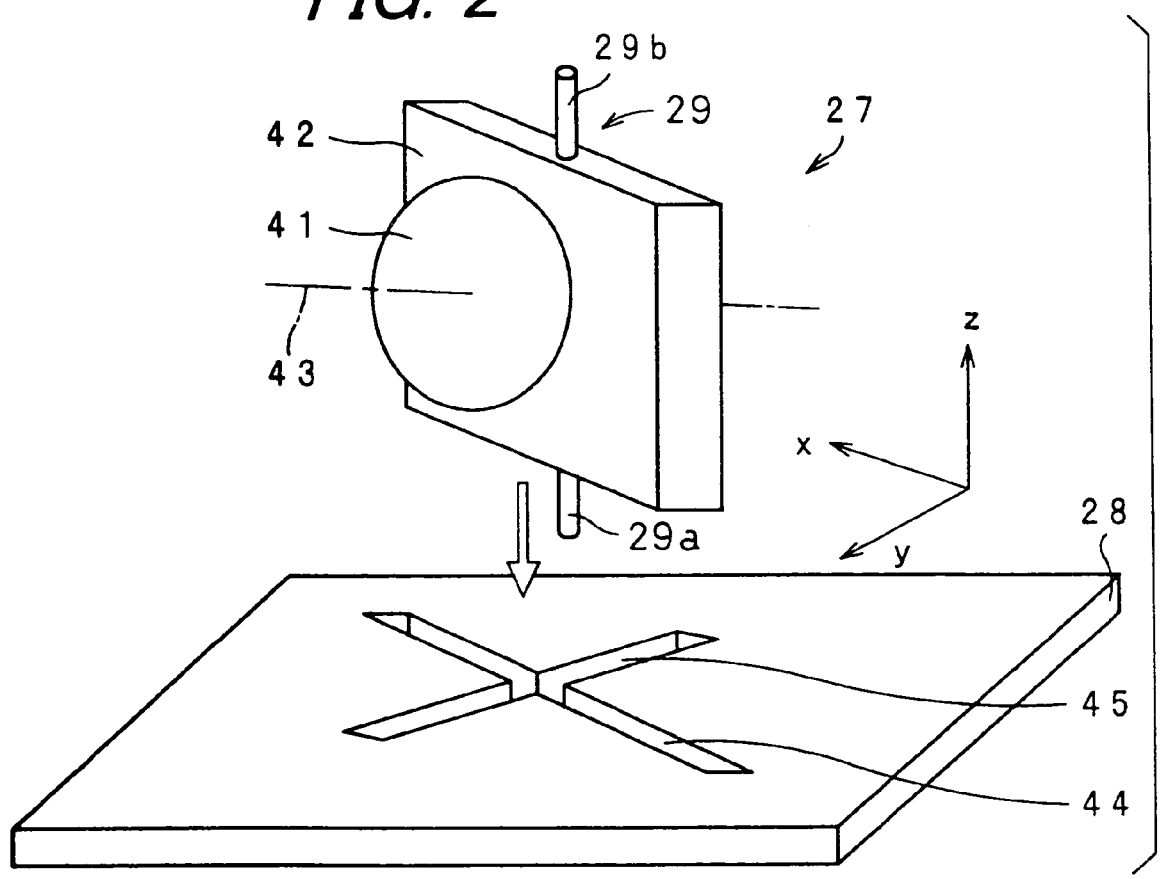
FIG. 2 is a simplified perspective view showing a structure of a condensing lens and a mounting base that are provided in the optical pickup shown in FIG. 1.
Figure 3:
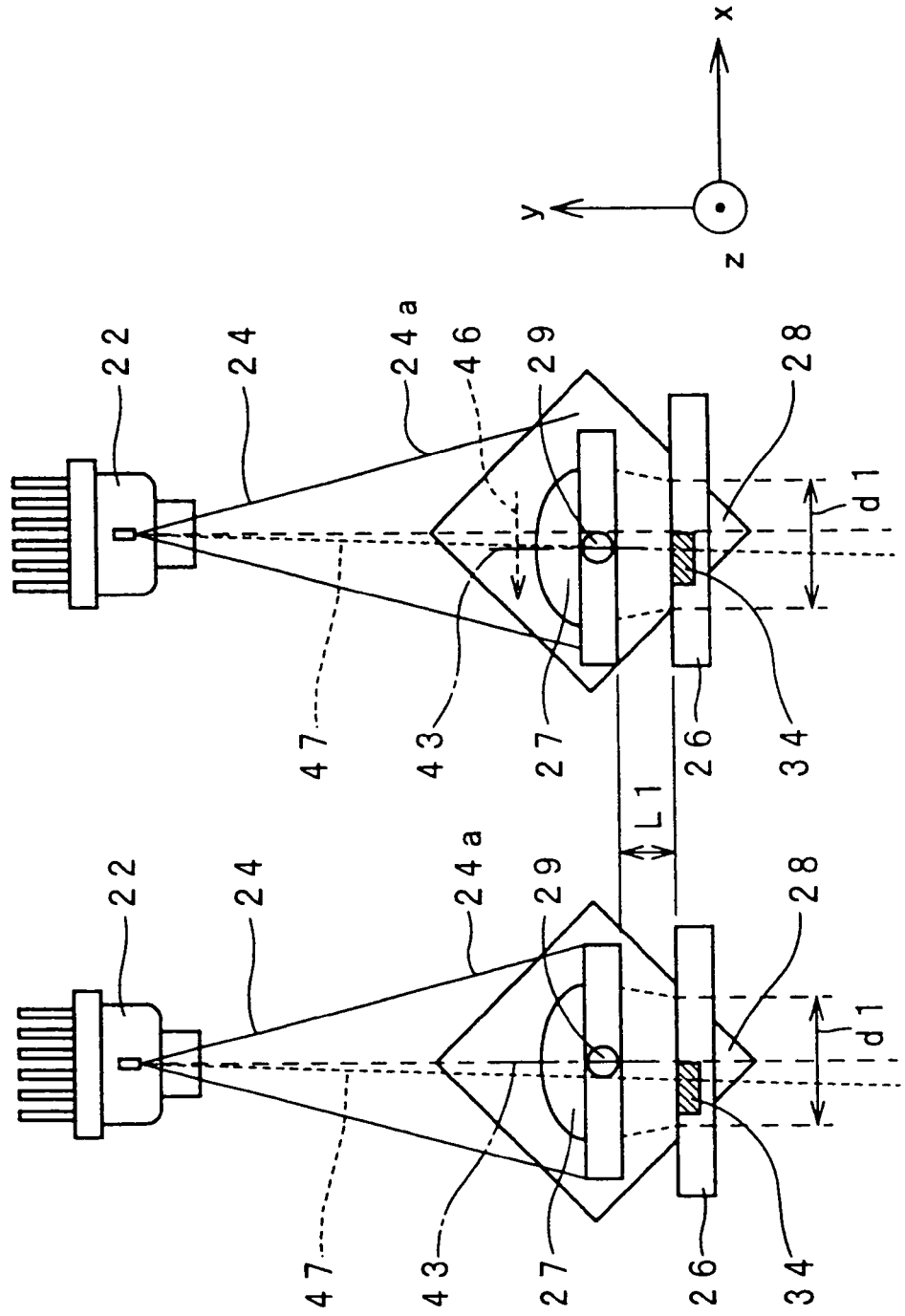
FIGS. 3A and 3B are views for explaining a motion of adjusting a mounting position of the condensing lens in the optical pickup shown in FIG. 1.

Now referring to the drawings, preferred embodiments of the invention are described below. 49 FIG. 1 is a simplified view showing a structure of an optical pickup 20 according to a first embodiment of the present invention, FIG. 2 is a simplified perspective view showing a structure of a condensing lens 27 and a mounting base 28 that are provided in the optical pickup 20 shown in FIG. 1, and FIGS. 3A and 3B are views for explaining a motion of adjusting a mounting position of the condensing lens in the optical pickup 20 shown in FIG. 1.

The optical pickup 20 of this embodiment includes two light sources, that is, first and second light sources 21 and 22, a light splitting element 25, a light receiving element 26, a condensing lens 27, a mounting base 28, adjusting means 29, a collimator lens 30, and an objective lens 31. The first and second light sources 21 and 22 emit light, respectively. The light splitting element 25 splits light by transmitting part of a first light beam 23 emitted from the first light source 21 and reflecting part of a second light beam 24 emitted from the second light source 22. The light receiving element 26 receives the first transmission light 23a, which is transmission light of the first light beam 23 split by the light splitting element 25, or second reflection light 24a, which is reflection light of the second light beam 24 split by the light splitting element 25. The condensing lens 27 is disposed between the light splitting element 25 and the light receiving element 26 and that guides the first transmission light 23a or second reflection light 24a split by the light splitting element 25 to the light receiving element 26. The condensing lens 27 is mounted on the mounting base 28. The adjusting means 29 adjusts a mounting position of the condensing lens 27 on the mounting base 28.

An optical apparatus 32 according to another embodiment of the invention is constituted by the first and second light sources 21 and 22, the light splitting element 25, the condensing lens 27, the light receiving element 26, the mounting base 28, and the adjusting means 29 that are included in the optical pickup 20.

The optical pickup 20 is used for recording information on and reproducing information from an optical recording medium 33 (sometimes referred to as the optical disk hereafter) by using light emitted from the first light source 21 or the second light source 22. The first light beam 23 emitted from the first light source 21 is partially transmitted by the light splitting element 25 and becomes the first transmission light 23a, and the rest thereof is reflected by the light splitting element 25 and becomes first reflection light 23b. The first reflection light 23b enters the collimator lens 30 to be made to become a parallel ray by the collimator lens 30, enters the objective lens 31 to be converged by the objective lens 31, applied to an information recording surface of the optical disk 33 as a light spot having a minute diameter, and used for recording (writing) or reproducing (reading) information. The second light beam 24 emitted from the second light source 22 is partially reflected by the light splitting element 25 and becomes the second reflection light 24a, and the rest thereof is transmitted by the light splitting element 25 and becomes second transmission light 24b. The second transmission light 24b split by the light splitting element 25 is used for recording or reproducing information in the same manner as the first reflection light 23b.

In FIG. 1, the objective lens 31 and the optical disk 33 are placed on the extension of the first reflection light 23b or the second reflection light 24b transmitted by the collimator lens 30. However, actually, the optical pickup 20 is structured so that a light path of the first reflection light 23b or the second transmission light 24b is bent to the front on a sheet of FIG. 1 by an erection mirror (not shown) that is disposed between the collimator lens 30 and the objective lens 31, and so that the optical disk 33 locates at the front on the sheet to the optical apparatus 32.

The optical apparatus 32 is used for monitoring an output of the first light beam 23 emitted from the first light source 21 or the second light beam 24 emitted from the second light source 22, by guiding the first transmission light 23a emitted from the first light source 21 and transmitted by the light splitting element 25 or the second reflection light 24a emitted from the second light source 22 and reflected by the light splitting element 25 to the light receiving element 26, and causing the light to enter a light receiving portion 34 provided in the light receiving element 26. Moreover, an APC is additionally provided in the optical apparatus 32 though illustration thereof is omitted. The APC carries out such control that a light output of the first or second light source 21, 22 becomes a desired value in accordance with the amount of light monitored by the light receiving portion 34.

The first and second light sources 21 and 22 are semiconductor lasers, and semiconductor lasers that emit laser beams having different wavelengths are used so that it is possible to record on and reproduce from two different kinds of optical disks 33, for example, a CD and a DVD. The light splitting element 25 is realized by, for example, a beam splitter. As the light receiving portion 34 provided in the light receiving element 26, a photoelectric conversion device such as a photodiode can be used, for example.

Referring to FIG. 2, a structure of the condensing lens 27 and the mounting base 28 will be described. The condensing lens 27 is formed so that a surface close to the light splitting element 25 is a curved surface and a surface close to the light receiving element 26 is a flat surface. In this embodiment, the condensing lens 27 is constituted by a lens portion 41 having a dome like curved surface, and a lens holder portion 42 having a rectangular shape that is connected to the lens portion 41 and formed closer to the light receiving element 26 than the lens portion 41. Moreover, the lens holder portion 42 of the condensing lens 27 is provided with protruding pieces 29a and 29b that protrude from the condensing lens 27 in a direction perpendicular to a central axis 43 (referred to as the lens axis 43 for convenience hereafter) of the lens portion 41 of the condensing lens 27 and extend like a rod. The protruding pieces 29a and 29b compose the adjusting means 29.

The condensing lens 27 is made of resin such as polyolefin. The condensing lens 27 is formed so that the lens portion 41 and the lens holder portion 42 are integrally molded by an injection molding method or the like by the use of the aforementioned resin as a material. Further the protruding pieces 29a and 29b formed on the lens holder portion 42 of the condensing lens 27 are formed by leaving, without eliminating, a resin mold product molded at a gate portion serving as an inlet of a die at the time of molding the condensing lens 27. The mounting base 28 is a plate-like member made of zinc die casting, for example. In this embodiment, two long grooves, that is, first and second long grooves 44 and 45 are formed on the mounting base 28 so as to face the condensing lens 27 and cross at right angles. Both the first and second long grooves 44 and 45 are formed into a rectangular shape. The mounting base 28 is placed so that a direction where the first long groove 44 extends is a direction where it gets close to and away from the collimator lens 30, and so that a direction where the second long groove 45 extends is a direction where it gets close to and away from the light splitting element 25.

Here, three dimensional directions, that is, x-axis, y-axis and z-axis directions in the optical apparatus 32 and the optical pickup 20 will be described. The direction of getting close to and away from the collimator lens 30 is referred to as the x-axis direction. The direction orthogonal to the x-axis direction and of getting close to and away from the light splitting element 25 is referred to as the y-axis direction. A direction orthogonal to the x-axis and the y-axis directions and of getting close to and away from a mounting surface, which is a surface where the condensing lens 27 is mounted, of the mounting base 28 is referred to as the z-axis direction.

Since the optical disk 33 locates at the front on the sheet of FIG. 1 to the optical apparatus 32 as mentioned before, the x-axis direction corresponds to a radial direction of a track formed on the optical disk 33, the y-axis direction corresponds to a tangent direction of the track, and the z-axis direction corresponds to a direction of getting close to and away from the optical disk 33, in a state where the optical disk 33 is mounted on the optical pickup 20. The x-axis, y-axis and z-axis directions will be used in common throughout this specification.

The condensing lens 27 is placed so that the one protruding piece 29a formed thereon is engaged with the first long groove 44 or the second long groove 45 of the mounting base 28. Therefore, it is possible to grasp the other protruding piece 29b formed on the condensing lens 27, and move the condensing lens 27 in the x-axis and y-axis directions in a manner that the one protruding piece 29a is guided by the first and second long grooves 44 and 45.

Referring to FIGS. 3A and 3B, a method for adjusting a mounting position in the x-axis and y-axis directions of the condensing lens 27, that is, adjusting the amount of light of the optical apparatus 32 by movement of the condensing lens 27 will be described. In order to make it easy to comprehend, FIGS. 3A and 3B show a condition such that the light splitting element 25 of the optical apparatus 32 is omitted, and such that the second light beam 24 and the second reflection light 24a are linearly connected.

At first, the condensing lens 27 is moved in the y-axis direction in a manner that the one protruding piece 29a of the condensing lens 27 is guided along the second long groove 45. By the movement in the y-axis direction of the condensing lens 27 the condensing lens 27 and the light receiving element 26 are placed so that an isolation distance L1 between a surface that faces the light receiving element 26 of the lens holder portion 42 of the condensing lens 27 and a light application surface of the light receiving element 26 becomes smaller than a focal distance of the condensing lens 27, and so that, in a case where the dimension of the light receiving portion 34 on the light application surface of the light receiving element 26 is D and variation tolerance of the light receiving portion to an external shape of the light receiving element is ±Δd, a spot diameter d1 of light guided by the condensing lens 27 and applied to the surface of the light receiving element 26 satisfies (d1≧D+2Δd).

Since the spot diameter dl of the light is small when it is less than D+2Δd, it is impossible to absorb variations of an installation position of the light receiving portion 34 in the light receiving element 26.

Next, the condensing lens 27 is moved in a direction of an arrow 46 of the x-axis direction in a manner that the one protruding piece 29a of the condensing lens 27 is guided along the first long groove 44. With this movement, the condensing lens 27 is placed so that the lens axis 43 of the condensing lens 27 coincides with a virtual light axis 47 that couples the second light source 22 and the light receiving portion 34 of the light receiving element 26.

As a result, it becomes possible to cause the maximum amount of light sufficient for stable control of a light output from the second light source 22, to enter the light receiving portion, regardless of variations of an installation position of the light receiving portion in each light receiving element. Moreover, it becomes easy to move to an optimum position where both the amounts of light applied from the first and second light sources 21 and 22 to the light receiving element 26 become a sufficient light amount for control of light outputs of the light sources. Furthermore, even when the virtual light axis 47 coupling the first light source 21 or the second light source 22 and the light receiving portion 34 is moved for correction of the optical apparatus 32, it is possible to easily secure a light amount that the light receiving element 26 in the corrected optical apparatus 32 receives, only by moving the condensing lens 27, without correcting the mounting base 28.

In this embodiment, the first and second long grooves 44 and 45 are formed on the mounting base 28, but a structure such that one of the grooves or both the grooves pierce the mounting base 28 in a thickness direction thereof is also within the scope of the invention.

Figure 4:
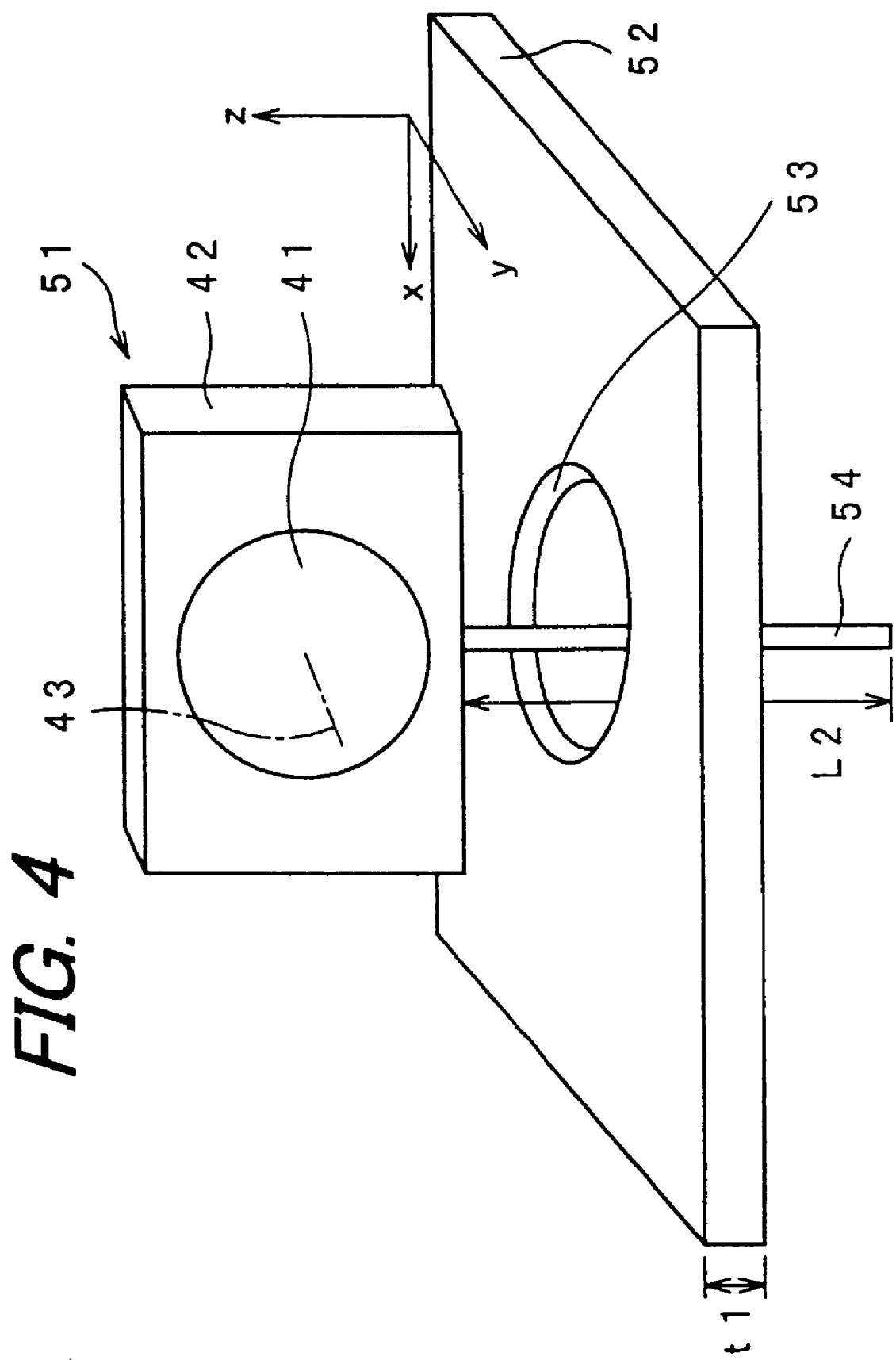
FIG. 4 is a simplified perspective view showing a structure of a condensing lens and a mounting base of an optical apparatus provided in an optical pickup according to a second embodiment of the invention.

FIG. 4 is a simplified perspective view showing a structure of a condensing lens 51 and a mounting base 52 of an optical apparatus provided in an optical pickup according to a second embodiment of the invention. Since the optical pickup of this embodiment is structured in the same way as the optical pickup 20 of the first embodiment except the condensing lens 51 and the mounting base 52 of the optical apparatus featuring the optical pickup, the illustration and description of the same portions will be omitted.

What should be noted in this embodiment is that the mounting base 52 is provided with a through hole 53 facing the condensing lens 51 and piercing the mounting base 52 in a direction perpendicular to the lens axis 43 of the condensing lens 51, and that only one protruding piece 54 protruding from the condensing lens 51 in the direction perpendicular to the lens axis 43 of the condensing lens 51 and extending like a rod is formed on the condensing lens 51 on a side facing the mounting base 52. Moreover, the condensing lens 51 and the mounting base 52 are placed so that the protruding piece 54 formed on the condensing lens 51 passes through the through hole 53 of the mounting base 52, and an extension length L2 of the protruding piece 54 is sufficiently larger than a thickness t1 of the mounting base 52 in a direction where the through hole 53 pierces.

By forming only one protruding piece 54 on the side facing the mounting base 52 of the condensing lens 51, and forming no protruding piece on a side opposite to the side facing the mounting base 52, that is, on a side where the optical disk 33 locates, it is possible to prevent the protruding piece from coming in contact with and damaging the optical disk 33. Moreover, by forming the through hole 53 so as to have a dimension including an expected adjustment range, it is possible to move and fix the condensing lens 51 easily and freely to a desired position in an x-y plane immediately, without using a complicated method such as once move in one of the x-axis and y-axis directions and then move in the other direction. Furthermore, since the protruding piece 54 is disposed so as to pass through the through hole 53, it is possible to move the condensing lens 51 in the z-axis direction and fix to a desired position, by grasping the protruding piece 54 and operating in the z-axis direction.

Thus, in the optical apparatus provided in the optical pickup of this embodiment, it is possible to move the condensing lens 51 in the three-dimensional directions of the x-axis, y-axis and z-axis directions and fix to a desired position. Consequently, for example, even when the light receiving portion 34 does not exist in the center of the light application surface of the light receiving element 26 but exists in a position off in the z-axis direction, that is, in a position leaning to a side of the upper surface or the bottom surface of the condensing lens 51, it is possible to move the condensing lens 51 in the z-axis direction, and adjust to a position such that the condensing lens can apply the maximum amount of light to the light receiving portion 34.

Further, in the optical apparatus provided in the optical pickup of this embodiment, it is possible to adjust the condensing lens 51 to a position such that the condensing lens can apply the maximum amount of light to the light receiving portion 34, and thereafter, fill an ultraviolet cure adhesive or the like in the through hole 53 of the mounting base 52 and cure by ultraviolet irradiation, thereby fixing the protruding piece 54, that is, the condensing lens 51 to the mounting base 52. By thus securely fixing the condensing lens 51 to the mounting base 52, the condensing lens 51 will not deviate from the adjusted position even when used for a long time. Therefore, it is possible to express a stable optical performance.

Further, it is preferred that after the condensing lens 51 is adjusted and fixed to the mounting base 52, a protruding portion of the protruding piece 54 that protrudes from the through hole 53 or from the ultraviolet cure resin adhesive filled in the through hole 53 on the opposite side to the side facing the condensing lens 51 is cut and removed. Consequently, it is possible to miniaturize the apparatus because it is possible to eliminate an unnecessary space occupied by the protruding piece 54.

Figure 5:
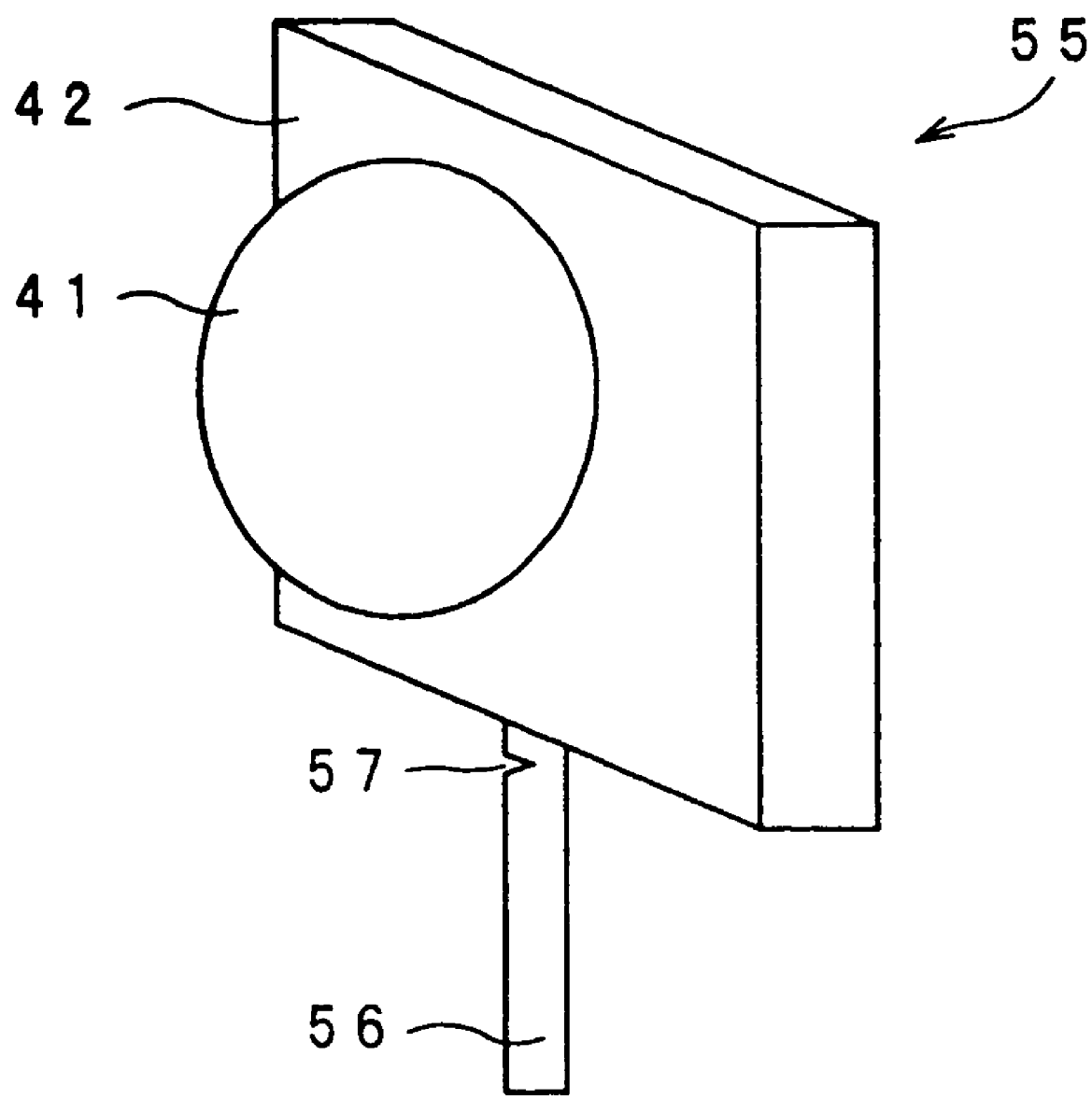
FIG. 5 is a perspective view showing a transformation example of a condensing lens disposed in an optical apparatus of the invention.

FIG. 5 is a perspective view showing a transformation example of a condensing lens disposed in an optical apparatus of the invention. A condensing lens 55 shown in FIG. 5 is characterized in that a protruding piece 56 formed on a side facing a mounting base has a cross section decreasing portion 57 where a cross section in a direction perpendicular to a direction of extension like a rod decreases. The cross section decreasing portion 57 of the protruding portion 56 can be realized by previously forming a protrusion corresponding to the cross section decreasing portion 57 having a desired shape at a gate portion of a die used for molding the condensing lens 55.

By forming the cross section decreasing portion 57 on the protruding piece 56, it is possible to cut the protruding piece 56 with a small force, so that it is possible to cut and remove an extra portion of the protruding piece 56 without making the condensing lens 55 after fixture adjustment be out of position. Moreover, it is possible to eliminate an unnecessary space occupied by the protruding piece 56 by cutting and removing an extra portion of the protruding piece 56, so that it is possible to miniaturize the apparatus.

FIGS. 6A and 6B are views showing a structure and a light amount adjusting method of an optical apparatus 60 provided in an optical pickup according to a third embodiment of the invention. The optical apparatus 60 provided in the optical pickup of this embodiment is similar to the optical apparatus 32 provided in the optical pickup 20 according to the first embodiment of the invention, so that corresponding portions will be denoted by the same reference numerals, and a description thereof will be omitted. In FIGS. 6A and 6B, the illustration of a mounting base is omitted.

What should be noted in the optical apparatus 60 is that a protruding piece 61 is formed in a position away from the lens axis 43 of a condensing lens 62 in a direction perpendicular to the lens axis 43, and that the condensing lens 62 is structured so as to be capable of angular displacement about an axial line of the protruding piece 61.

As miniaturization is requested, an optical apparatus is designed so that various members are intensively disposed in a narrow space. Therefore, there is a case, for example, as shown in FIG. 6A such that, although the lens axis 43 of the condensing lens 62 deviates from the virtual light axis 47 coupling the first light source 21 and the light receiving portion 34 in the x-axis direction, it is difficult to move and adjust the condensing lens 62 in the x-axis direction because other members 64a and 64b are disposed on both sides of the condensing lens 62 in the x-axis direction and a movable range is restricted by interference with the other members 64a and 64b.

In this case, by causing the condensing lens 62 to perform angular displacement about the axial line of the protruding piece 61 as shown in FIG. 6B, it is possible to adjust the lens axis 43 so as to locate on the virtual light axis 47. Consequently, even when there is no degree of freedom of adjustment in the x-axis direction, it is possible to apply light as much as possible to the light receiving portion 34.

Figure 7:
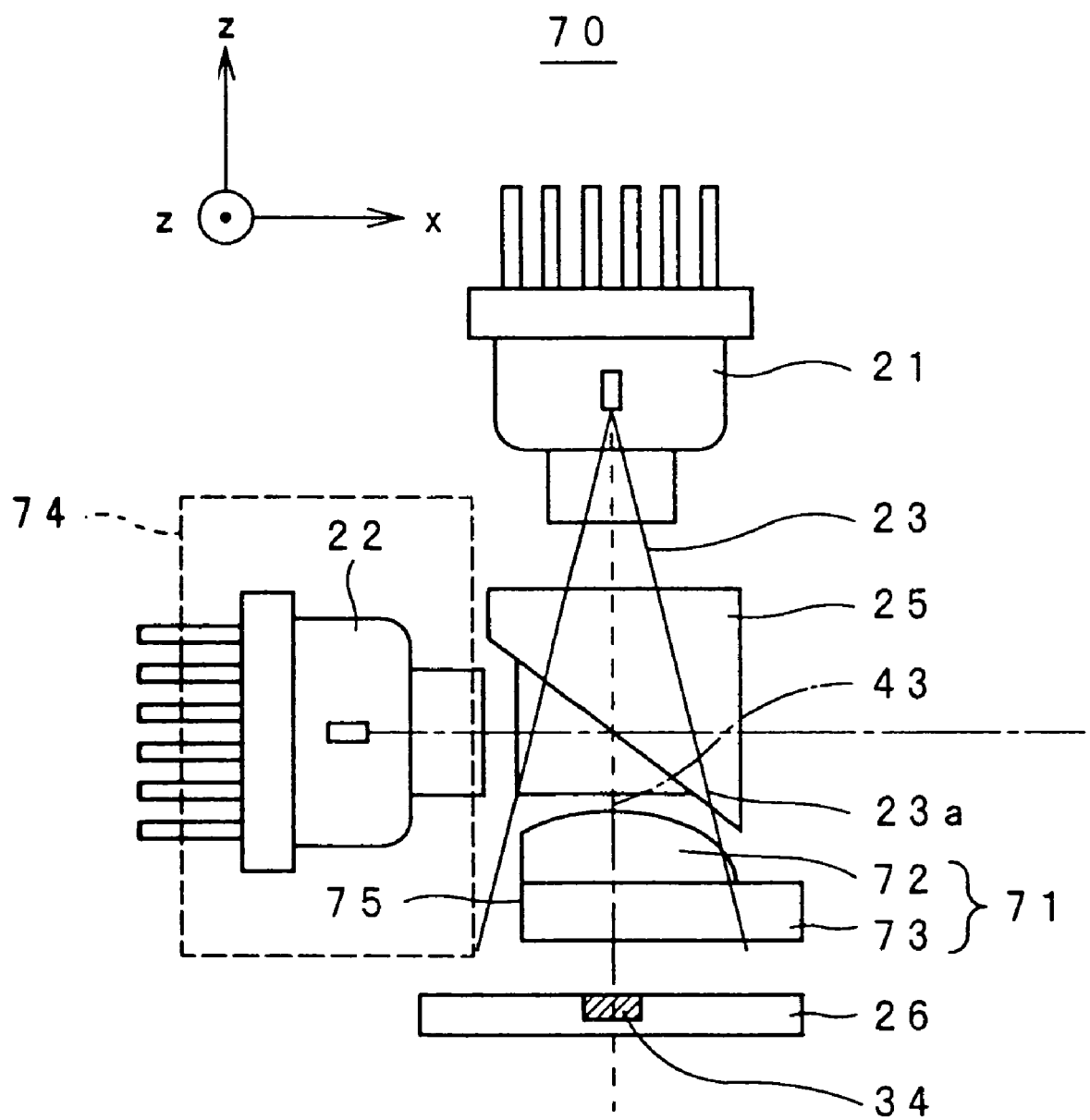
FIG. 7 is a simplified view showing a structure of an optical apparatus provided in an optical pickup according to a fourth embodiment of the invention.
Figure 8:
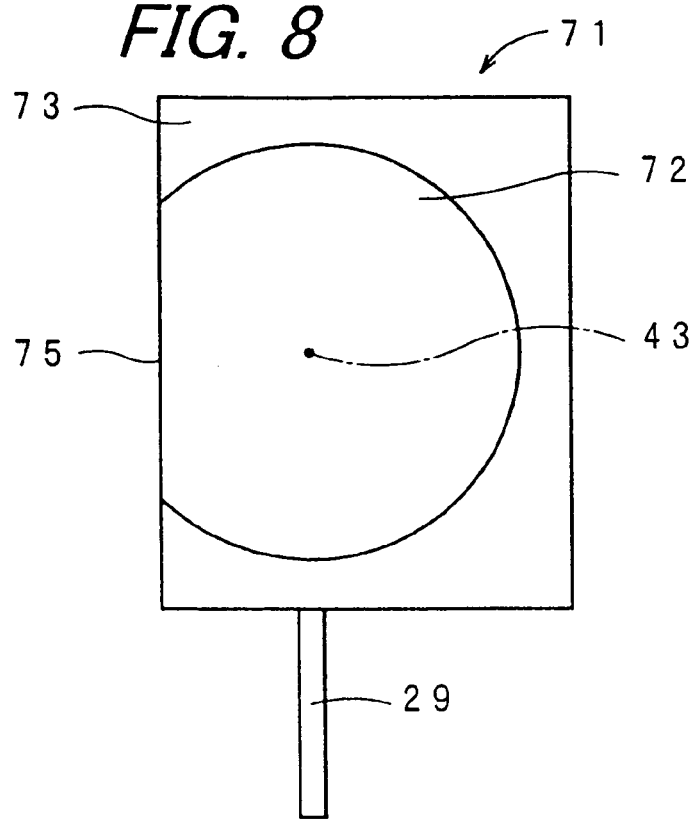
FIG. 8 is a plan view showing a structure of a condensing lens disposed in the optical apparatus shown in FIG. 7.

FIG. 7 is a simplified view showing a structure of an optical apparatus 70 provided in an optical pickup according to a fourth embodiment of the invention, and FIG. 8 is a plan view showing a structure of a condensing lens 71 disposed in the optical apparatus 70 shown in FIG. 7. The optical apparatus 70 provided in the optical pickup of this embodiment is similar to the optical apparatus 32 provided in the optical pickup 20 according to the first embodiment of the invention, so that corresponding portions will be denoted by the same reference numerals, and a description thereof will be omitted.

The condensing lens 71 disposed in the optical apparatus 70, more strictly speaking, a lens portion 72 of the condensing lens 71 is formed into an arched shape on a plan view taken from a direction parallel to the lens axis 43. A lens holder portion 73 of the condensing lens 71 is formed into a rectangular shape.

As an electronic apparatus provided with an optical pickup is miniaturized, the optical pickup and optical members provided in the optical pickup are miniaturized, so that there is a case as shown in FIG. 7 that a space to install the condensing lens 71 interferes with the second light source 22 and a light source holding member 74 for holding the second light source 22, and therefore, it is difficult to install. In this case, by using the condensing lens 71 having an arched shape that is asymmetrical with respect to the lens axis 43 as described before, and placing so that a surface 75 (referred to as the chord forming surface 75 for convenience) appearing as a chord of the arch on the plan view faces the light source holding member 74, it is possible to install the condensing lens 71 without trouble even in a narrow installation space, with the result that it is possible to respond to miniaturization of the apparatus.

Figure 9:
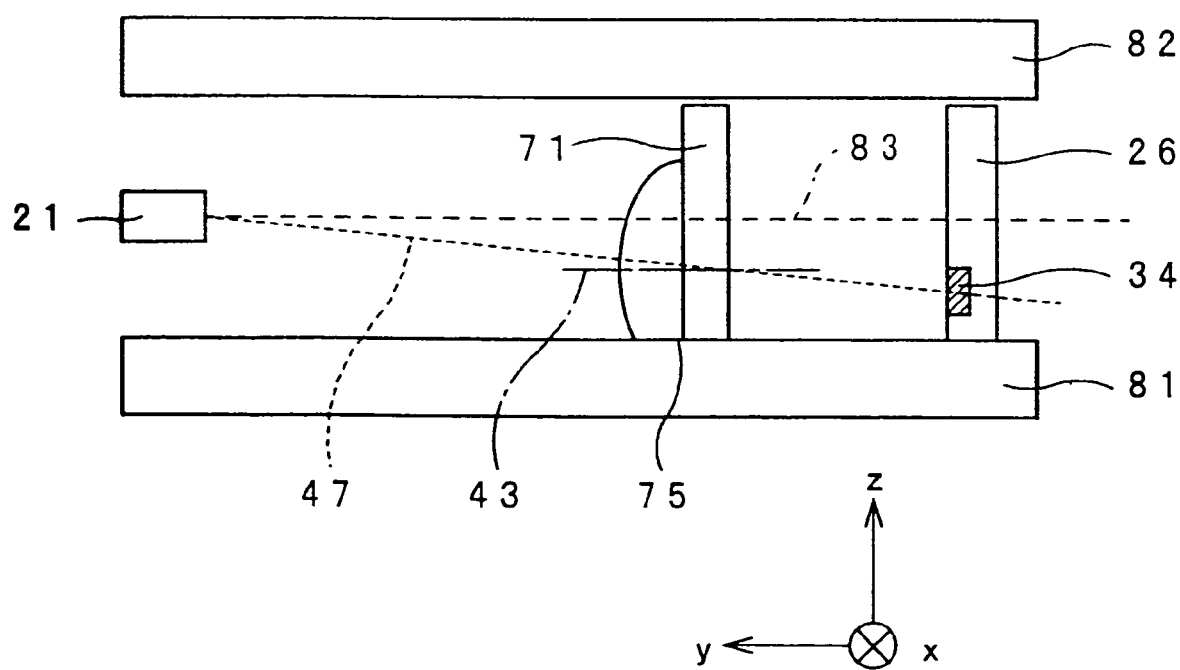
FIG. 9 is a simplified view showing a structure of an optical apparatus provided in an optical pickup according to a fifth embodiment of the invention.
Figure 10:
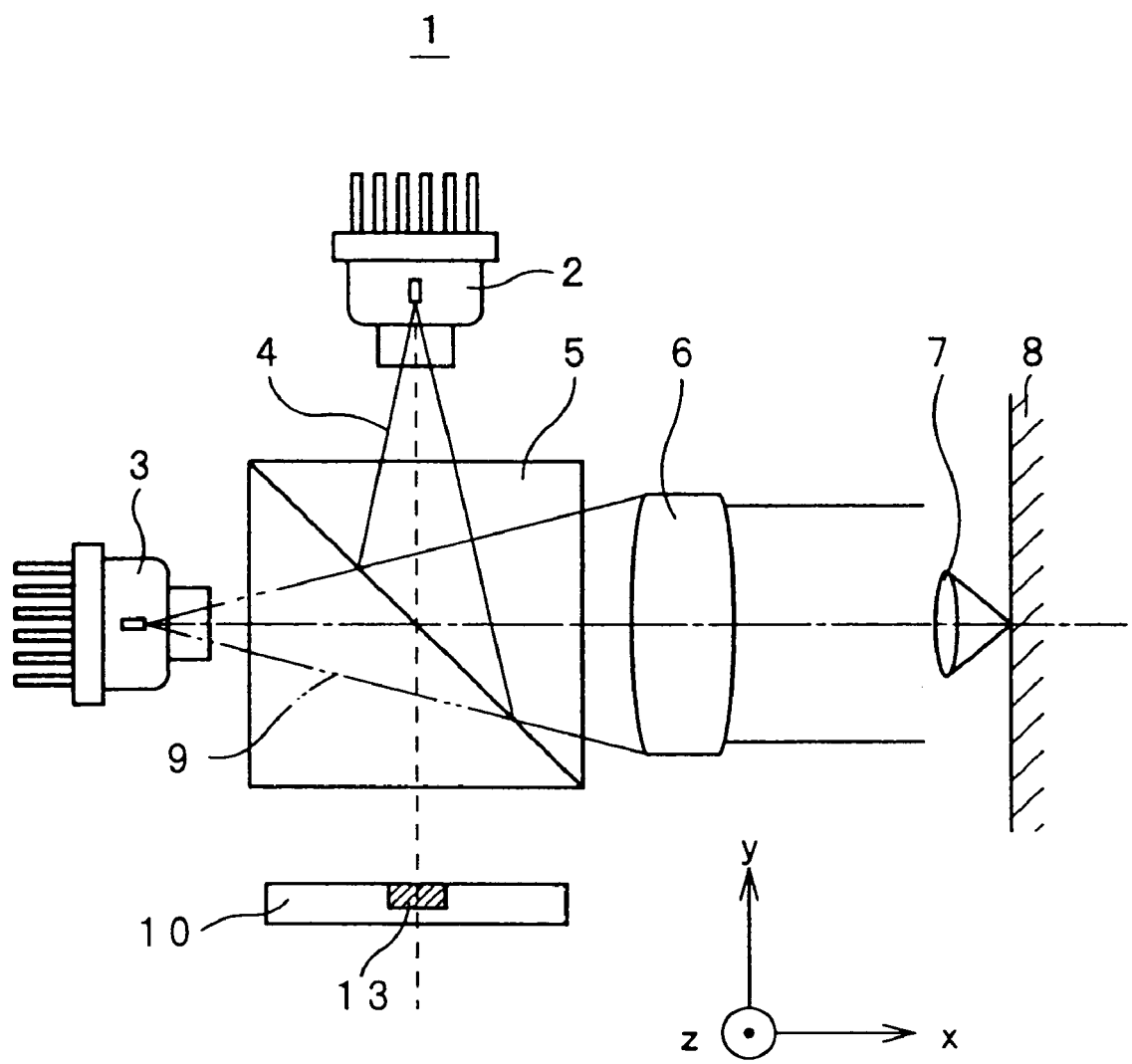
FIG. 10 is a view showing a structure of a major part of a conventional optical pickup apparatus.
Figure 11:
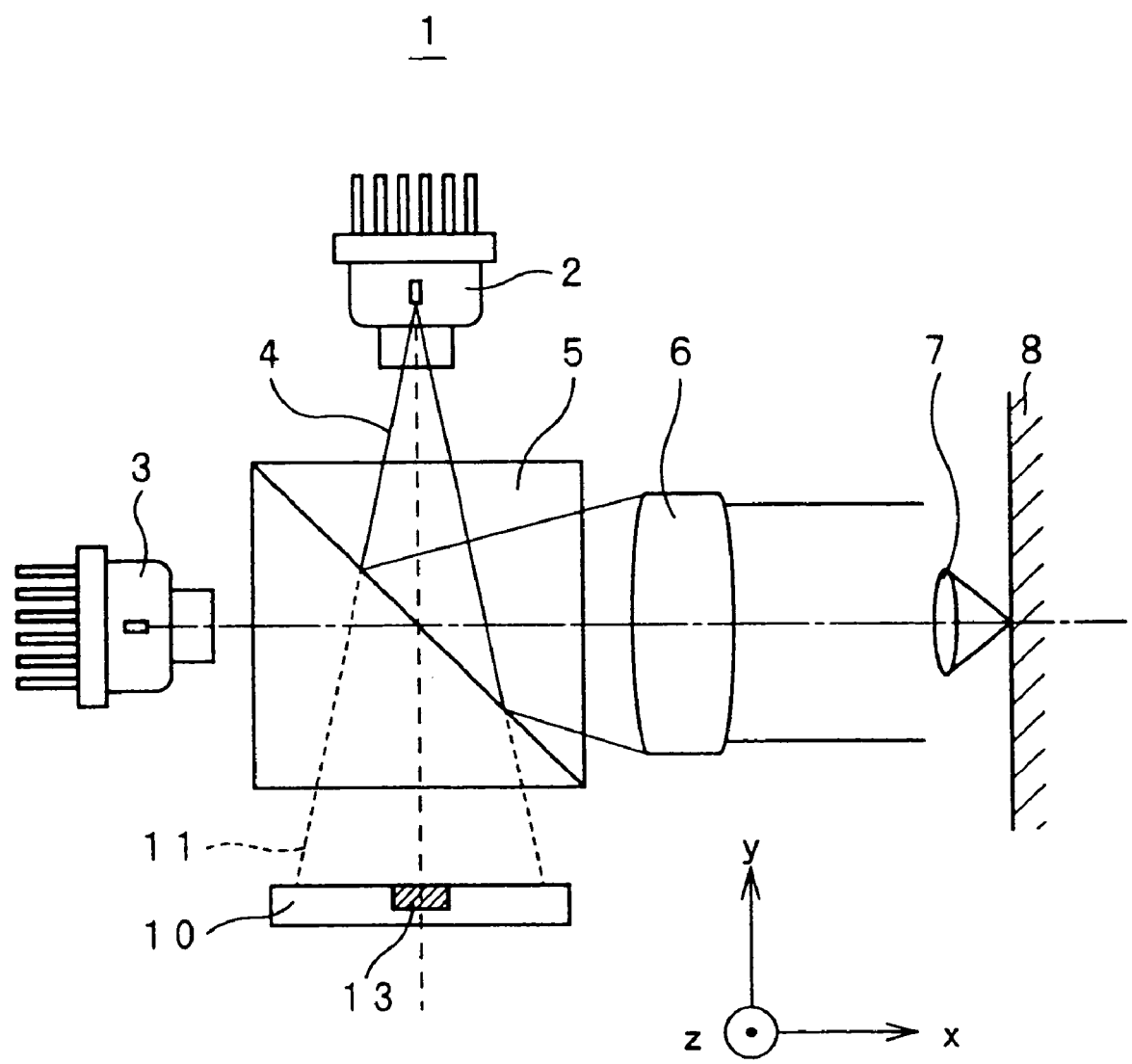
FIG. 11 is a view showing a state where a light output of the first light source is monitored.
Figure 12:
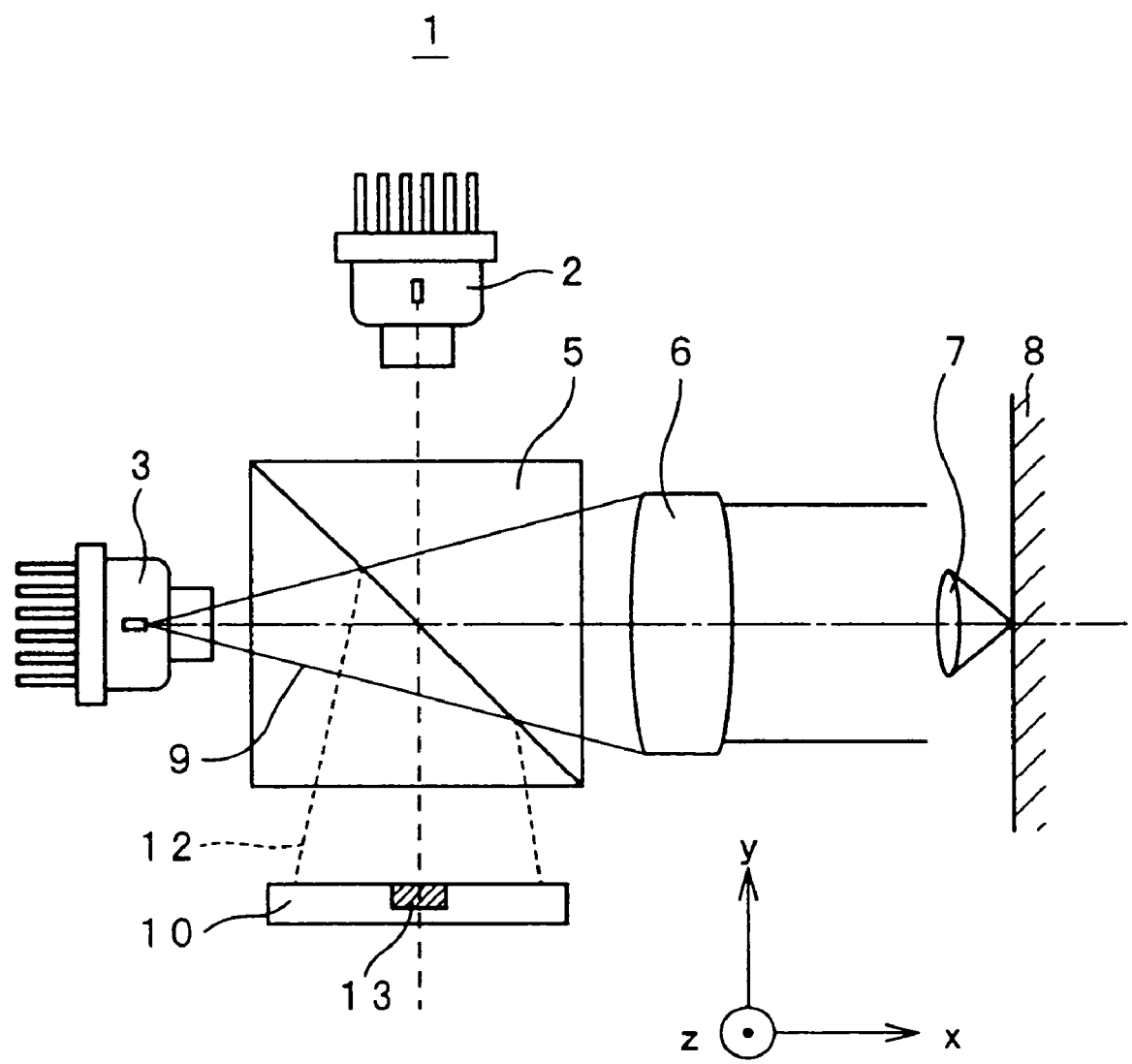
FIG. 12 is a view showing a state where a light output of the second light source is monitored.

FIG. 9 is a simplified view showing a structure of an optical apparatus 80 provided in an optical pickup according to a fifth embodiment of the invention. In FIG. 9, the illustration of a light splitting element will be omitted. The optical apparatus 80 provided in the optical pickup of this embodiment is similar to the optical apparatus 70 provided in the optical pickup according to the fourth embodiment of the invention, so that a description of corresponding portions will be omitted.

In the optical apparatus 80, the respective optical members are contained and installed in a limited space between a first mounting base 81 and a second mounting base 82 that is disposed so as to face the first mounting base 81 and placed above the first mounting base 81 in the z-axis direction, and the arched condensing lens 71 is mounted so as to make the chord forming surface 75 in contact with the first mounting base 81.

When various optical members are contained and installed in such a narrow and limited space, there is no free space in the installation space of the respective members, so that there is a case that a light axis 83 of the first light emitted from the first light source 21 and the virtual light axis 47 coupling the first light source 21 and the light receiving portion 34 of the light receiving element 26 do not coincide with each other, and that the light receiving portion 34 of the light receiving element 26 must be placed so that both the light axes are shifted from each other. In FIG. 9, a case where the virtual light axis 47 is shifted from the light axis 83 toward the first mounting base 81 will be exemplified. In a case where the optical axis 83 and the virtual light axis 47 are shifted from each other, it is possible to place so that the lens axis 43 of the condensing lens 71 locates on the virtual light axis 47, by using the arched condensing lens 71 and mounting so as to make the chord forming surface 75 of the condensing lens 71 into contact with the first mounting base 81.

According to this structure, in the slim optical apparatus 80, even when the light receiving portion 34 of the light receiving element 26 does not locate on the light axis 83 of the emission light from the light source 21, it is possible to apply light as much as possible to the light receiving portion 34.

The respective optical pickups according to the first to fifth embodiment described before can be installed in an electronic apparatus such as an information recording and reproducing apparatus that uses optical disks such as a CD and a DVD. The electronic apparatus provided with the optical pickups of the respective embodiments of the invention can stably control a light output from a light source to a desired value, and therefore, can record and reproduce information at a stable signal level.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical apparatus comprising:
   a light source for emitting light;
   a light splitting element for splitting light by transmitting or reflecting part of the light emitted from the light source;
   a light receiving element for receiving the transmission light or reflection light split by the light splitting element;
   a condensing lens, disposed between the light splitting element and the light receiving element, for guiding the transmission light or reflection light split by the light splitting element to the light receiving element;
   a mounting base for mounting the condensing lens; and
   an adjusting means for adjusting a mounting position of the condensing lens on the mounting base, wherein the adjusting means includes a protruding piece formed so as to protrude from the condensing lens in a direction perpendicular to a central axis of the condensing lens and extend like a rod.

2. The optical apparatus of claim 1, wherein the protruding piece is formed on a side of the condensing lens facing the mounting base.

3. The optical apparatus of claim 1, wherein the protruding piece is formed in a position away from the central axis of the condensing lens in a direction perpendicular to the central axis, and
   the condensing lens is capable of angular displacement about an axial line of the protruding piece.

4. The optical apparatus of claim 1, wherein the protruding piece has a cross section decreasing portion where a cross section in a direction perpendicular to a direction where the protruding piece extends like a rod decreases.

5. The optical apparatus of claim 1, wherein the condensing lens is made of resin, and
   the protruding piece protruding from the condensing lens and formed like a rod, is a resin mold product molded at a gate portion at a time of molding the condensing lens.

6. The optical apparatus of claim 5, wherein the condensing lens is mounted so that a chord forming surface on the plan view taken from a direction parallel to the central axis comes in contact with the mounting base.

7. The optical apparatus of claim 1, wherein the condensing lens is formed like an arch on a plan view taken from a direction parallel to a central axis thereof.

8. The optical apparatus of claim 1, wherein the condensing lens is formed so that a surface close to the light splitting element is a curved surface and a surface close to the light receiving element is a flat surface.

9. The optical apparatus of claim 1, wherein the condensing lens and the light receivng element are placed so that an isolation distance between the condensing lens and the light receiving element becomes smaller than a focal distance of the condensing lens and so that, when a dimension of a light receiving portion on a light application surface of the light receiving element is D and variation tolerance of the light receiving portion to an external shape of the light receiving element is $\pm\Delta d$, a spot diameter of light guided by the condensing lens and applied to a surface of the light receiving element becomes $(D+2\Delta d)$ or more.

10. An optical pickup provided with the optical apparatus of claim 1.

11. An electronic apparatus in which the optical pickup of claim 10 is installed.

12. An optical apparatus comprising:
    a light source for emitting light;
    a light splitting element for splitting light by transmitting or reflecting part of the light emitted from the light source;
    a light receiving element for receiving the transmission light or reflection light split by the light splitting element;
    a condensing lens, disposed between the light splitting element and the light receiving element, for guiding the transmission light or reflection light split by the light splitting element to the light receiving element;
    a mounting base for mounting the condensing lens,
    wherein two long grooves are formed on the mounting base so as to face the condensing lens and cross at right angles.

13. An optical apparatus comprising:
    a light source for emitting light;
    a light splitting element for splitting light by transmitting or reflecting part of the light emitted from the light source;
    a light receiving element for receiving the transmission light or reflection light split by the light splitting element;

a condensing lens, disposed between the light splitting element and the light receiving element, for guiding the transmission light or reflection light by the light splitting element to the light receiving element;

a mounting base for mounting the condensing lens; and a protruding piece on the condensing lens, wherein a through hole that faces the condensing lens and pierces the mounting base in a direction perpendicular to a central axis of the condensing lens, is formed in the mounting base, wherein the condensing lens and the mounting base are placed so that the protruding piece formed on the condensing lens passes through the through hole of the mounting base, and an extension length of the protruding piece is more than thickness of the mounting base in a direction where the through hole pierces.

14. The optical apparatus of claim 13, further comprising an ultraviolet cure adhesive in the through hole of the mounting base, wherein the position of the condensing lens on the mounting base is in an adjusted state.

15. The optical apparatus of claim 13, further comprising a protruding piece on the condensing lens, wherein the optical apparatus is formed by passing the protruding piece through the hole on the mounting base, wherein a protruding portion of the protruding piece protrudes from the through hole on a side opposite to a side facing the condensing lens;

adjusting the condensing lens to an adjusted state; and cutting and removing the portion of the protruding piece protruding on the side opposite to the side facing the condensing lens, wherein the condensing lens on the mounting base is in an adjusted state.

16. A light amount adjusting method of an optical apparatus including a light source for emitting light; a light splitting element for splitting light by transmitting or reflecting part of light emitted from the light source; a light receiving element for receiving the transmission light or reflection light split by the light splitting element; a condensing lens, disposed between the light splitting element and the light receiving element, for guiding the transmission light or reflection light split by the light splitting element to the light receiving element; a protruding piece formed so as to protrude from the condensing lens in a direction perpendicular to a central axis of the condensing lens and extend like a rod; and a mounting base for mounting a condensing lens, the method comprising:

grasping the protruding piece formed on the condensing lens; and moving the condensing lens in a direction parallel to an axis of light entering the condensing lens, to adjust an amount of light entering the light receiving element.

17. A light amount adjusting method of an optical apparatus including a light source for emitting light; a light spitting element for splitting light by transmitting or reflecting part of light emitted from the light source; a light receiving element for receiving the transmission light or reflection light split by the light splitting element; a condensing lens, disposed between the light splitting element and the light receiving element, for guiding the transmission light or reflection light split by the light splitting element to the light receiving element; a protruding piece formed so as to protrude from the condensing lens in a direction perpendicular to a central axis of the condensing lens and extend like as rod; and amounting the condensing lens, the method comprising:

grasping the protruding piece formed on the condensing lens; and moving the condensing lens in a direction parallel to a surface of the mounting base where the condensing lens is mounted and in a direction perpendicular to an axis of light entering the condensing lens, to adjust an amount of light entering the light receiving element.

18. A light amount adjusting method of an optical apparatus including a light source for emitting light; a light spitting element for splitting light by transmitting or reflecting part of light emitted from the light source; a light receiving element for receiving the transmission light or reflection light split by the light splitting element; a condensing lens, disposed between the light splitting element and the light receiving element, for guiding the transmission light or reflection light split by the light splitting element to the light receiving element; a protruding piece formed so as to protrude from the condensing lens in a direction perpendicular to a central axis of the condensing lens and extend like a rod; and amounting base for mounting the condensing lens, the method comprising:

grasping the protruding piece formed on the condensing lens; and moving the condensing lens in a direction perpendicular to a surface of the mounting base where the condensing lens is mounted, to adjust an amount of light entering the light receiving element.

19. A light amount adjusting method of an optical apparatus including a light source for emitting light; a light splitting element for splitting light by transmitting or reflecting part of light emitted from the light source; a light receiving element for receiving the transmission light or reflection light split by the light splitting element; a condensing lens, disposed between the light splitting element and the light receiving element, for guiding the transmission light or reflection light split by the light splitting element to the light receiving element; a protruding piece formed so as to protrude from the condensing lens in a direction perpendicular to a central axis of the condensing lens and extend like a rod; and amounting base for mounting the condensing lens, the protruding piece being formed in a position away from the central axis of the condensing lens in a direction perpendicular to the central axis thereof, and the condensing lens being disposed so as to be angularly displaced about an axial line of the protruding piece, the method comprising:

grasping the protruding piece formed on the condensing lens; and causing the condensing lens to perform an angular displacement about the axial line of the protruding piece, to adjust an amount of light entering the light receiving element.

\* \* \* \* \*